United States Patent [19]

Mitchell

[11] Patent Number: 4,819,115
[45] Date of Patent: Apr. 4, 1989

[54] END CONNECTIONS FOR WOUND CAPACITORS AND METHODS OF MAKING THE SAME

[75] Inventor: James T. Mitchell, American Township; Allen County, Ohio

[73] Assignee: Westinghouse Electric Corp., Pittsburgh, Pa.

[21] Appl. No.: 149,262

[22] Filed: Jan. 28, 1988

[51] Int. Cl.$^4$ .................. H01G 1/14; H01G 7/00; H01R 4/00
[52] U.S. Cl. .................. 361/308; 174/94 R; 29/25.42
[58] Field of Search .............. 361/308, 309, 310, 306, 361/433 S, 433 C, 433 T; 24/126.2, 115, 265 EE, 122.3; 29/29.42; 338/308, 300, 329; 174/74 R, 90, 94 R; 228/904

[56] References Cited

U.S. PATENT DOCUMENTS

| | | | |
|---|---|---|---|
| 2,582,931 | 1/1952 | Kodama | 361/306 |
| 2,898,655 | 8/1959 | Van Buskirk | 24/122.6 X |
| 3,143,692 | 8/1964 | Terry | 361/310 X |
| 3,284,684 | 11/1966 | Gaenge | 361/309 |
| 3,513,369 | 5/1970 | England et al. | 361/308 |
| 3,849,708 | 11/1974 | Leighton | 361/308 |
| 4,226,011 | 10/1980 | Hunt | 361/309 X |
| 4,535,381 | 8/1985 | Rayburn | 361/308 |
| 4,715,118 | 12/1987 | Bernard et al. | 361/308 X |

FOREIGN PATENT DOCUMENTS

| | | | |
|---|---|---|---|
| 3425727 | 1/1986 | Fed. Rep. of Germany | 361/306 |
| 331803 | 7/1980 | United Kingdom | 361/308 |

Primary Examiner—Donald A. Griffin
Attorney, Agent, or Firm—R. P. Lenart

[57] ABSTRACT

A wound capacitor end connection is constructed by spraying a first layer of metal onto one end of a capacitor winding, positioning strands of a stranded conductor adjacent to the first layer, without mechanically securing the strands to the first layer, and spraying a second layer of metal over the strands and first layer to mechanically and electrically connect the strands to the first layer. In an alternative embodiment, the stranded conductor may be replaced by a perforated conductor having openings which provide additional electrical and mechanical connection points between the two sprayed metal layers.

4 Claims, 1 Drawing Sheet

END CONNECTIONS FOR WOUND CAPACITORS AND METHODS OF MAKING THE SAME

BACKGROUND OF THE INVENTION

This invention relates to the connection of electrical terminals to wound capacitors and, more particularly, to such connections which employ sprayed metal electrodes.

Wound capacitors typically include a pair of sheets of dielectric material, each having a conductive layer deposited on one side. The dielectric sheets are wound adjacent to each other about a common axis to provide a cylindrical assembly. An axial displacement is provided between the conductive layers so that the conductive layers are exposed at opposite ends of the cylindrical assembly. A metal electrode is formed by spraying metal on each end of the assembly, thereby short circuiting adjacent edges of the metal layer exposed at that particular end of the assembly. A conductor is then electrically and mechanically connected to the sprayed metal electrode, typically by soldering. Since some of the sprayed metals, for example, aluminum or zinc, do not solder readily, the conductor attachment must be welded or a solderable metal over-sprayed on the aluminum or zinc.

Thin dielectric capacitor films are easily damaged by heat from soldering or welding, or by flux or cleaning solutions applied prior to attachment of the conductor. Even with a highly skilled operator, there is always a danger of damaging the dielectric film during the conductor attachment process.

It is therefore desirable to provide a capacitor end terminal, which has both adequate electrical and mechanical properties, without the need for soldering or welding.

SUMMARY OF THE INVENTION

This invention includes a method of making an end connection on a wound capacitor comprising the steps of spraying the first layer of metal onto one end of a capacitor winding, positioning a stranded conductor adjacent to the first layer of metal, without mechanically securing the conductor to the metal, such that portions of the strands lie along the surface of the metal layer and are spaced apart from each other. A second layer of metal is then sprayed onto the first layer, such that the second layer covers the conductor strands and makes electrical and mechanical contact with the first layer along edges of the strands and between the strands, thereby mechanically and electrically connecting the strands of the conductor to the first metal layer.

In an alternative embodiment, a perforated conductor may be substituted for the stranded conductor.

This invention also encompasses an end connection on a wound capacitor constructed in accordance with the above method and comprising a first layer of metal deposited on one end of a capacitor winding, a stranded conductor positioned adjacent to the first layer of metal such that portions of the strands lie along the metal layer surface, and a second layer of metal covering portions of the conductor strands and making mechanical and electrical contact with the first layer along edges of the strands and between the strands, thereby mechanically and electrically connecting the strands to the first layer. In another alternative embodiment, the stranded conductor can be replaced by a perforated conductor.

BRIEF DESCRIPTION OF THE DRAWINGS

The invention will become more readily apparent from the following description of the preferred embodiments thereof, shown by way of example only, in the accompanying drawings wherein.

DESCRIPTION OF THE PREFERRED EMBODIMENTS

Figures 1, 2, 3, 4:
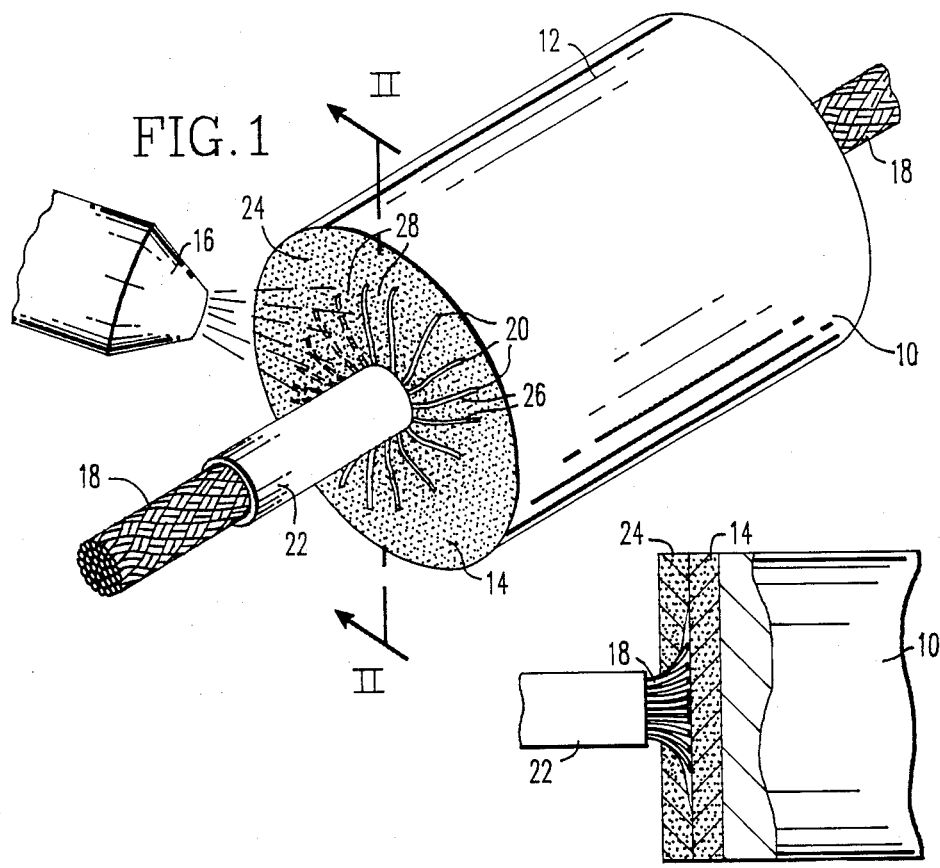
FIG. 1 is an isometric view of a capacitor having end terminals constructed in accordance with one embodiment of the present invention.
FIG. 2 is a cross-section of one of the capacitor end terminals of FIG. 1 taken along line II—II.
FIG. 3 is an isometric view of a capacitor end terminal constructed in accordance with an alternative embodiment of this invention.
FIG. 4 is a cross-section of a portion of the end terminal of FIG. 3 taken along line IV—IV.

Referring to the drawings, FIG. 1 is an isometric view of a capacitor including end terminals constructed in accordance with one embodiment of the present invention. A capacitor 10 includes a cylindrical assembly 12 constructed of wound layers of metallized dielectric films in accordance with known construction techniques. A first sprayed metal electrode 14 having a thickness of about 0.01 to 0.015 inches, is deposited on one end of the cylindrical assembly 12 by metal spray nozzle 16 in accordance with known techniques. A braided or stranded conductor 18 having a plurality of individual conductive strands 20 is positioned such that portions of the individual strands 20 lie adjacent to the first layer of metal 14. A positioning fixture 22 is used to hold the conductor 18 in place and the strands 20 are spread over the first conductive layer 14 such that portions of the layer 14 are exposed between the strands 20. The second layer of metal 24 is then sprayed by nozzle 16 onto the first layer such that the second layer covers the portions of the strands of the conductor which lie adjacent to the first layer and makes mechanical and electrical contact with the first layer along edges 26 of the strands and between the strands as illustrated by areas 28, thereby mechanically and electrically connecting the strands to the first layer. It should be noted that the strands of conductor 20 are not secured, by soldering, welding or other means, prior to deposition of the second layer of sprayed metal. This eliminates the possibility of capacitor winding damage due to excessive heat.

Capacitor terminals have been constructed as illustrated in FIG. 1 on a capacitor having a ⅝ inch diameter tubular body, using a braided conductor including approximately 96 strands of 0.005 inch diameter wire. Zinc was used to construct the sprayed metal electrodes. The first layer of sprayed metal was approximately 0.012 inch thick and the second layer of sprayed metal was approximately 0.015 inch thick. The portions of the strands which lie adjacent to the first layer of sprayed metal were arranged in a generally radial pattern.

FIG. 2 includes a cross-section of the end connection of FIG. 1 taken along line II—II. In FIG. 2, the thickness of the sprayed metal layers 14 and 24 has been exaggerated to illustrate that the strands of conductor 18 are embedded in layer 24. The sprayed metal layers may be composed of zinc, babett, aluminum, copper, or other materials suitable for use in a sprayed metal process. Conductor 18 may be fashioned from braided wire tubing of the type frequently used for shielding electrical wiring. After the second metal layer is sprayed on top of the first layer, the tubular fixture 22 is removed.

FIGS. 3 and 4 illustrate an alternative embodiment of this invention. In this alternative embodiment, stranded conductor 18 has been replaced by a perforated conductor 30 in the form of a sheet of conductive material. The perforated sheet includes a plurality of holes 32 sized such that a significant portion, for example fifty percent, of conductor 30 has been removed. In this embodiment, a first metal electrode 14' is sprayed by nozzle 16 onto one end of capacitor assembly 12'. Then, perforated conductor 30 is positioned adjacent to the first layer 14' and a second layer 24' is sprayed by nozzle 16 such that the second layer makes electrical and mechanical contact to the first layer at locations 34 and 36 provided by the openings 32. The second layer also makes electrical and mechanical contact along the sides 38 of the holes 32 and the edge of conductor 30.

It should be apparent to those skilled in the art that the present invention encompasses the capacitor end connections illustrated in the drawings and the methods used to make those connections. This invention provides capacitor end terminals having sufficient mechanical strength for use in high vibration applications. Damage to the capacitor winding during manufacture of the end terminals is avoided by eliminating the need to solder or weld the conductor to the sprayed metal electrode.

While the present invention has been described in terms of what are at present believed to be its preferred embodiments, it should be understood that various changes may be made to those embodiments without departing from the scope of the invention. For example, the fixture used to hold the stranded conductor 18 of FIG. 1 could be replaced by a fixture which is attached to the inside diameter of the capacitor winding and could include a small tube for masking the metal spray from the unflaired portion of the stranded conductor. The invention is also applicable to film/foil capacitors, where the dielectric film is not metallized and rolls of foil serve as the conducting layer. It is therefore intended that the appended claims cover such changes.

What is claimed is:

1. A method of making an end connection on a wound capacitor, comprising the steps of:
    spraying a first layer of metal onto one end of a capacitor winding;
    positioning a stranded conductor, having a plurality of strands, adjacent to said first layer of metal, without mechanically securing said conductor or said strands to said first layer of metal, such that portions of said strands lie along a surface of said first layer and are spaced from each other; and
    spraying a second layer of metal onto said first layer of metal, said second layer covering said portions of said strands and making mechanical and electrical contact with said first layer along edges of said strands and between said strands, thereby mechanically and electrically connecting said strands to said first layer.

2. A method of making an end connection on a wound capacitor as recited in claim 1, wherein:
    said strands lie in a generally radial pattern on said first layer of metal.

3. An end connection on a wound capacitor, comprising:
    a first layer of metal on one end of a capacitor winding;
    a stranded conductor, having a plurality of strands, positioned adjacent to said first layer of metal, such that portions of said strands lie along a surface of said first layer and are spaced from each other; and
    a second layer of metal on said first layer of metal, said second layer covering said portions of said strands and making mechanical and electrical contact with said first layer along edges of said strands and between said strands, thereby mechanically and electrically connecting said strands to said first layer.

4. An end connection on a wound capacitor, as recited in claim 3, wherein:
    said strands lie in a generally radial pattern.

* * * * *